US008790197B2

(12) United States Patent
Okabe et al.

(10) Patent No.: US 8,790,197 B2
(45) Date of Patent: Jul. 29, 2014

(54) GOLF BALL

(75) Inventors: Satoko Okabe, Kobe (JP); Kazuya Kamino, Kobe (JP)

(73) Assignee: SRI Sports Limited, Kobe (JP)

( * ) Notice: Subject to any disclaimer, the term of this patent is extended or adjusted under 35 U.S.C. 154(b) by 306 days.

(21) Appl. No.: 13/401,169

(22) Filed: Feb. 21, 2012

(65) Prior Publication Data

US 2012/0214613 A1 Aug. 23, 2012

(30) Foreign Application Priority Data

Feb. 22, 2011 (JP) ................................. 2011-035835

(51) Int. Cl.
*A63B 37/04* (2006.01)

(52) U.S. Cl.
USPC .............................. 473/373; 473/374; 473/376

(58) Field of Classification Search
USPC .......................................... 473/371–374, 376
See application file for complete search history.

(56) References Cited

U.S. PATENT DOCUMENTS

| 5,556,098 | A | | 9/1996 | Higuchi et al. | |
|---|---|---|---|---|---|
| 5,872,185 | A | * | 2/1999 | Ichikawa et al. | 525/93 |
| 6,015,356 | A | | 1/2000 | Sullivan et al. | |
| 6,120,392 | A | | 9/2000 | Kashiwagi et al. | |
| 8,292,759 | B2 | * | 10/2012 | Nakamura et al. | 473/376 |
| 8,314,172 | B2 | * | 11/2012 | Hirau et al. | 524/322 |
| 2001/0018374 | A1 | * | 8/2001 | Ichikawa et al. | 473/367 |
| 2002/0119840 | A1 | * | 8/2002 | Higuchi et al. | 473/384 |
| 2005/0020783 | A1 | * | 1/2005 | Takesue et al. | 525/439 |
| 2010/0167840 | A1 | * | 7/2010 | Hirau et al. | 473/373 |
| 2010/0167841 | A1 | * | 7/2010 | Okabe et al. | 473/373 |

FOREIGN PATENT DOCUMENTS

| JP | 6-142228 | A | | 5/1994 | |
|---|---|---|---|---|---|
| JP | 6-343718 | A | | 12/1994 | |
| JP | 2278609 | A | | 12/1994 | |
| JP | 7-24084 | A | | 1/1995 | |
| JP | 9-248351 | A | | 9/1997 | |
| JP | 10-80505 | A | | 3/1998 | |
| JP | 10-201880 | A | | 8/1998 | |
| JP | 2000-60998 | A | | 2/2000 | |
| JP | 2000-84117 | A | | 3/2000 | |
| JP | 2000-176050 | A | | 6/2000 | |
| JP | 2002-191719 | A | | 7/2002 | |
| JP | 2003-183484 | | * | 7/2003 | ............ C08G 63/91 |
| JP | 2003-183484 | A | | 7/2003 | |
| JP | 2005-13487 | A | | 1/2005 | |

* cited by examiner

*Primary Examiner* — Gene Kim
*Assistant Examiner* — John E Simms, Jr.
(74) *Attorney, Agent, or Firm* — Birch, Stewart, Kolasch & Birch, LLP

(57) ABSTRACT

The present invention is directed to a golf ball having a center, an envelope layer, an intermediate layer and a cover, wherein the intermediate layer has a thickness less than 1.2 mm, the envelope layer has a hardness Hs of 60 or more, the intermediate layer has a hardness Hm from 40 to 60, and the cover has a hardness Hc less than 40 in Shore D hardness, and the hardness Hs, Hm and Hc satisfy a following mathematical expression: Hs>Hm>Hc, and the intermediate layer composition has a flexural modulus from 150 MPa to 450 MPa, a maximum loss factor (tan δ) between −20° C. and 0° C. of 0.08 or less, a rebound resilience of 55% or more.

18 Claims, 1 Drawing Sheet

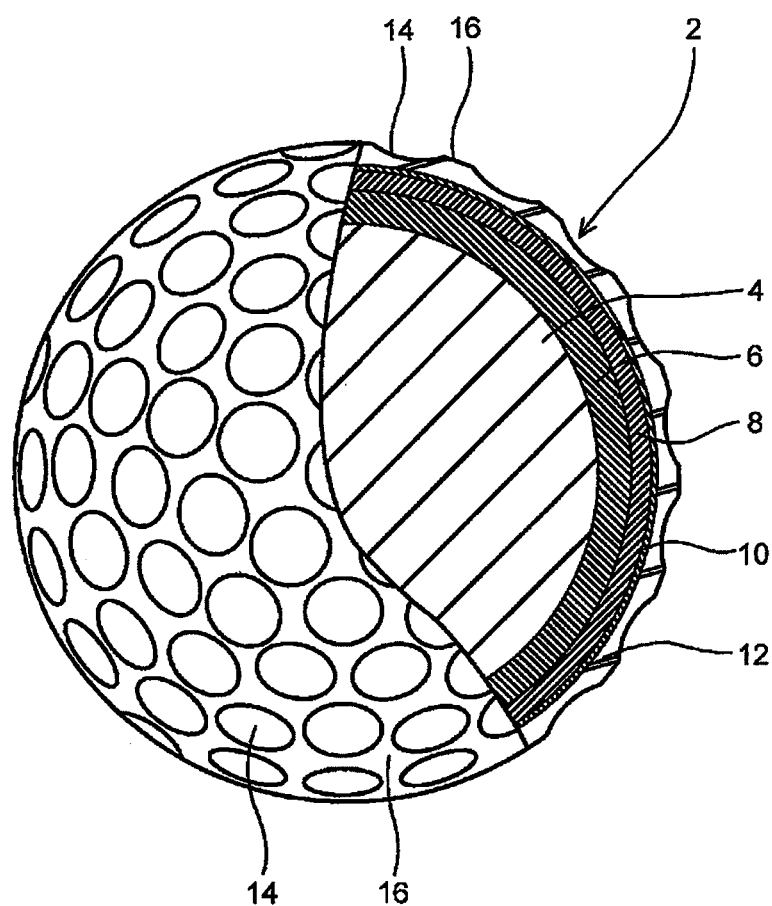

GOLF BALL

FIELD OF THE INVENTION

The present invention relates to a golf ball, more particularly to a multi-piece golf ball including a center, an envelope layer, an intermediate layer and a cover.

DESCRIPTION OF THE RELATED ART

Golf balls comprising a center, a cover, and at least one intermediate layer disposed between the center and the cover are known. The intermediate layer is also referred to as "inner cover layer" or "outer core layer" based on the golf ball construction. In order to improve the golf ball performance, the golf ball construction and materials for the intermediate layer have been studied.

For example, Japanese Patent Publication No. H06-343718 A discloses a golf ball comprising (i) a spherical center, (ii) an inner cover layer molded on the spherical center, having a modulus of 15,000 to 70,000 psi, and containing a high acid content ionomer resin containing a copolymer with 17 to 25 weight % of α,β-unsaturated carboxylic acid, and (iii) an outer cover layer molded on the inner cover layer, having a modulus of 1,000 to 10,000 psi, and containing a polymer material selected from the group consisting of an ionomer resin and a nonionic thermoplastic elastomer.

Japanese Patent Publication No. H10-201880 A discloses a multi-layer golf ball having a greater moment of inertia comprising a core, an inner cover layer and an outer cover layer having a dimpled surface, wherein said core has a diameter from 1.28 to 1.57 inches and a weight of 18 to 38.7 grams, said inner cover layer has a thickness of from 0.01 to 0.200 inches and a weight, with core, of 32.2 to 44.5 grams and said outer cover layer has a thickness of from 0.01 to 0.110 inches and a weight, with core and inner cover layer, of 45.0 to 45.93 grams.

Japanese Patent Publication No. H07-24084 A discloses a three-piece golf ball comprising a center core having a diameter of 26 mm or more, a density of less than 1.4 and a JIS-C hardness of 80 or less, an intermediate layer having a thickness of 1 mm or more, specific gravity of less than 1.2 and a JIS-C hardness of less than 80, and a cover having a thickness of 1 to 3 mm, a JIS-C hardness of 85 or more, wherein the center core is formed from a rubber composition containing a polybutadiene as a base material, and the intermediate layer is formed from a thermoplastic polyester elastomer as a base material.

Japanese Patent Publication No. 2000-84117 A discloses a golf ball comprising a core, an intermediate layer around the core, and a cover around the intermediate layer, wherein said intermediate layer is formed mainly of a heated mixture of (A) a thermoplastic polyether ester elastomer having a Shore D hardness of 25 to 50, a tan δ value of 0.1 or less in the temperature range of −10° C. to 20° C. as determined by viscoelasticity measurement, and a glass transition temperature of not higher than −20° C. and (B) an olefin elastomer, modified olefin elastomer, styrene-conjugated diene block copolymer or hydrogenated styrene-conjugated diene block copolymer, having a JIS A hardness of 80 or less.

Japanese Patent Publication No. H06-142228 A discloses a multi-piece solid golf ball comprising a multi-layered solid core consisting of an inner core and one or at least two outer core layers covering the inner core, and a cover covering the multi-layered core, wherein the outer core layer is formed from a material mainly containing a mixture of 50% to 100% of a thermoplastic polyether ester elastomer having a Shore D hardness of 30 to 50, a glass transition temperature of −25° C. or less determined by differential thermal analysis (DSC) and 0% to 50% of an ionomer consisting of an ethylene-(meth) acrylic acid copolymer having a flexural modulus of 200 MPa to 400 MPa, and the cover is formed from an ionomer consisting of an ethylene-(meth)acrylic acid copolymer having a flexural modulus of 200 to 450 MPa, and a Shore D hardness of 55 to 68.

Japanese Patent Publication No. H10-80505 A discloses a golf ball comprising a core, an intermediate layer enclosing a surface of the core, and a cover enclosing a surface of the intermediate layer, wherein a resin component forming said intermediate layer contains a mixture of 10 to 60 parts by weight of a thermoplastic elastomer having a crystalline polyethylene block and 90 to 40 parts by weight of an ionomer resin having a melt index of at least 3 g/10 min. at 190° C. as a primary component.

Japanese Patent Publication No. 2000-176050 A discloses a multi-piece golf ball with at least three layers comprising a core, an intermediate layer, and a cover, wherein the intermediate layer is formed from a material blending a product obtained by heating and mixing 100 parts by mass of a thermoplastic polyester elastomer and 0.1 to 10 parts by mass of a metal compound containing magnesium oxide or magnesium hydroxide Japanese Patent Publication No. 2005-13487 A discloses a golf ball comprising a core and a cover of one or more layers enclosing the core, wherein at least one layer which constitutes said cover is formed primarily of a mixture comprising (A) an ionomer resin composition, (B) a thermoplastic elastomer selected from a thermoplastic polyester elastomer, thermoplastic block copolymer and thermoplastic polyurethane, and (C) a thermoplastic block copolymer terminated with a functional group capable of reacting with the ionomer resin, in such a proportion as to provide a A/(B+C) weight ratio between 50/50 and 98/2 and a B/C weight ratio between 9/1 and 1/1.

Japanese Patent Publication No. H09-248351A discloses a multi-piece golf ball with at least three layers comprising a core, an innermost layer cover covering the core, at least one intermediate layer cover covering the innermost layer cover and an outermost layer cover covering the intermediate layer cover, wherein the intermediate layer has at least one cover layer which is harder than the innermost layer cover and the outermost layer cover.

Japanese Patent Publication No. 2000-60998 A discloses a multi-piece solid golf ball comprising a solid core, an envelope layer covering the core, at least one intermediate layer covering the envelope layer and at least one cover layer covering the intermediate layer, wherein the envelope layer and intermediate layer have a shore D hardness from 10 to 50, where the intermediate layer has a smaller shore D hardness than the envelope layer and the solid core has a deformation A from 2.5 to 7.5 mm under a load of 100 kg, one sphere consisting of the solid core covered in the envelope layer, another sphere consisting of the above sphere further covered in the intermediate layer, and the final ball exhibit respective deformation values B, C and D all measured in millimeters under a load of 100 kg, which satisfy relations: 0.85≤B/A≤1.15, 0.85≤C/B≤1.15, 0.7≤D/C≤1.0.

Japanese Patent Publication No. 2002-191719 A discloses a multi-piece solid golf ball comprising a rubber elastic solid core and a resin cover of at least three layers including an inner layer disposed adjacent to the solid core, an outer layer provided on the outer surface thereof with a multiplicity of dimples and an intermediate layer between the inner layer and the outer layer, wherein the solid core has a hardness corresponding to a deflection of at least 1.6 mm under an applied load of 294 N (30 kgf), the cover inner layer has a Shore D hardness of at least 55, the cover outer layer has a Shore D hardness of 40 to 55, and the cover intermediate layer has a Shore D hardness A of 8 to 50 and a thickness B of up to 1.2 mm, wherein A and B satisfy the relationship: A/B≥35.

Japanese Patent Publication No. 2003-183484 A discloses a thermoplastic resin composition comprising a modified polyester elastomer obtained by a reaction between a polyester elastomer and an unsaturated carboxylic acid or a derivative thereof in the presence of a radical generator. As an application of the thermoplastic resin composition, a golf ball is exemplified.

SUMMARY OF THE INVENTION

Since 2010 a new groove regulation has entered in force in a professional golf world on clubs having a loft angle of 25° or more such as irons or wedges. This new regulation will be gradually applied to amateur golfers. Since this regulation reduces the spin rate on approach shots with irons or wedges, it becomes difficult to stop the golf ball on the green. Based on this background, golf balls that have a higher spin rate in order to stop easily on the green are required. As a method for increasing the spin rate on approach shots, employing a soft material for a cover material is known. However, with the method of employing a soft material for a cover material, there is a problem that the spin rate on driver shots increases and thus the flight distance on driver shots are reduced. Therefore, increasing the spin rate on approach shots as well as increasing the flight distance on driver shots is difficult.

As a method for increasing the spin rate on approach shots and increasing the flight distance on driver shots, employing an intermediate layer having a high resilience has been studied. An intermediate layer composition having a higher resilience than the conventional intermediate layer composition using a blend of a polystyrene elastomer and an ionomer resin is required. Although the ionomer resin having a high neutralization degree provides a high resilience, the problem is that the moldability thereof is low. Materials having a high resilience tend to have a high hardness. If the intermediate layer has a high hardness, the problem is that a shot feeling becomes low. For providing a better shot feeling, lowering the hardness of the intermediate layer to some extent is required.

For striking a balance between the resilience and shot feeling, employing a polyester elastomer for the intermediate layer has been considered. However, it is difficult to provide a higher resilience in a range from 40 to 60 in Shore D hardness if the polyester elastomer is solely used for the intermediate layer composition. A blend of the ionomer resin for a higher resilience causes a problem that the durability becomes low.

The present invention has been achieved in view of the above circumstances. An object of the present invention is to provide a golf ball traveling a great distance on driver shots while having a high spin rate on approach shots, with an excellent shot feeling and durability.

The present invention that has solved the above problems provides a golf ball having a center, an envelope layer disposed outside the center, an intermediate layer disposed outside the envelope layer and a cover disposed outside the intermediate layer, wherein the intermediate layer has a thickness Tm less than 1.2 mm, the envelope layer has a Shore D hardness Hs of 60 or more, the intermediate layer has a Shore D hardness Hm in a range from 40 to 60, and the cover has a Shore D hardness Hc less than 40, and the hardness Hs, Hm and Hc satisfy a following mathematical expression: Hs>Hm>Hc, and wherein the intermediate layer is formed from an intermediate layer composition having a flexural modulus ranging from 150 MPa to 450 MPa, a maximum loss factor (tan δ) between −20° C. and 0° C. of 0.08 or less, and a rebound resilience of 55% or more, and the intermediate layer composition comprises, as a resin component, 30 mass % to 70 mass % of (A) a modified polyester elastomer having a Shore A hardness of 95 or less;

70 mass % to 30 mass % of (B) a binary ionomer resin having a Shore D hardness of 65 or more, a flexural modulus of 300 MPa or more, and a melt flow rate (190° C., 2.16 kg) of 1.0 g/10 min or more; and 0 mass % to 50 mass % of (C) a thermoplastic resin other than (A) component and (B) component (provided that a total content of (A) component, (B) component, and (C) component is 100 mass %).

When the golf ball of the present invention is hit with a short iron, the cover of the golf ball deforms significantly. Because the cover of the golf ball of the present invention is soft, the spin rate is high when the golf ball is hit with a short iron. The cover provides excellent controllability. When the golf ball is hit with a driver, the center and the envelope layer significantly deform together with the cover and the intermediate layer. Because the envelope layer has a high hardness, a spherical body consisting of the center and the envelope layer has an outer-hard/inner-soft structure. The outer-hard/inner-soft structure suppresses spin. Because of a low spin rate, a long flight distance is obtained upon a driver shot. Because the hardness Hm of the intermediate layer is less than the hardness Hs of the envelope layer and greater than the hardness Hc of the cover, the soft shot feeling is achieved by the intermediate layer. The golf ball of the present invention has excellent flight performance, excellent controllability and excellent feel at impact.

The intermediate layer of the golf ball of the present invention is formed from the intermediate layer composition comprising (A) the modified polyester elastomer and (B) the binary ionomer resin. (A) The modified polyester elastomer has high compatibility with (B) the binary ionomer resin and has an action of softening the obtained intermediate layer. The obtained intermediate layer has a high resilience and can strike a balance between a soft shot feeling and resilience.

According to the present invention, a golf ball traveling a great distance on driver shots while having a high spin rate on approach shots, with an excellent shot feeling and durability is obtained.

BRIEF DESCRIPTION OF THE DRAWINGS

FIG. 1 is a schematic cross sectional view illustrating an embodiment of the golf ball of the present invention.

DESCRIPTION OF THE PREFERRED EMBODIMENT

The golf ball of the present invention has a center, an envelope layer disposed outside the center, an intermediate layer disposed outside the envelope layer and a cover disposed outside the intermediate layer, wherein the intermediate layer has a thickness Tm less than 1.2 mm, the envelope layer has a Shore D hardness Hs of 60 or more, the intermediate layer has a Shore D hardness Hm in a range from 40 to 60, and the cover has a Shore D hardness Hc less than 40, and the hardness Hs, Hm and Hc satisfy a following mathematical expression: Hs>Hm>Hc, and wherein the intermediate layer is formed from an intermediate layer composition having a flexural modulus ranging from 150 MPa to 450 MPa, a maximum loss factor (tan δ) between −20° C. and 0° C. of 0.08 or less, and a rebound resilience of 55% or more, and the intermediate layer composition comprises, as a resin component, 30 mass % to 70 mass % of (A) a modified polyester elastomer having a Shore A hardness of 95 or less; 70 mass % to 30 mass % of (B) a binary ionomer resin having a Shore D hardness of 65 or more, a flexural modulus of 300 MPa or more, and a melt flow rate (190° C., 2.16 kg) of 1.0 g/10 min or more; and 0 mass % to 50 mass % of (C) a thermoplastic resin other than (A) component and (B) component (provided that a total content of (A) component, (B) component, and (C) component is 100 mass %).

(1) Golf Ball Construction

The golf ball of the present invention has a center, an envelope layer disposed outside the center, an intermediate layer disposed outside the envelope layer and a cover disposed outside the intermediate layer, wherein the intermediate layer has a thickness Tm less than 1.2 mm, the envelope layer has a Shore D hardness Hs of 60 or more, the intermediate layer has a Shore D hardness Hm in a range from 40 to 60 and the cover has a Shore D hardness Hc less than 40, and the hardness Hs, Hm and Hc satisfy a following mathematical expression: Hs>Hm>Hc.

In the followings, the preferable embodiments of the present invention will be described, referring to the drawings.

FIG. 1 is a partially cutaway view of a golf ball 2 according to an embodiment of the present invention. The golf ball 2 includes a center 4, an envelope layer 6 disposed outside the center 4, an intermediate layer 8 disposed outside the envelope layer 6 and a cover 12 disposed outside the intermediate layer 8. In order to improve the adhesion between the intermediate layer 8 and the cover 12, a reinforcing layer 10 may be disposed between the intermediate layer 8 and the cover 12. On the surface of the cover 12, a large number of dimples 14 are formed. Of the surface of the golf ball 2, a part other than the dimples 14 is a land 16. The golf ball 2 includes a paint layer and a mark layer on the external side of the cover 12 although these layers are not shown in the drawings. In the present invention, a spherical body consisting of the center 4, the envelope layer 6 and the intermediate layer 8 is sometimes merely referred to as "core".

The center generally has the spherical shape, but the center may be provided with a rib on the surface thereof so that the surface of the spherical center is evenly divided by the ribs. In one embodiment, the ribs are preferably formed on the surface of the spherical center in an integrated manner. The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east (west), assuming that the meridian as the standard is at longitude 0 degree. If the ribs are formed, the depressed portion divided by the ribs are preferably filled with a plurality of envelope layers or with a single-layered envelope layer that fills each of the depressed portions to make a molded body consisting of the center and the envelope layer in the spherical shape.

The central hardness H1c of the center is preferably 35 or more, more preferably 40 or more, even more preferably 45 or more in JIS-C hardness. If the central hardness H1c is 35 or more in JIS-C hardness, the resilience improves. In light of suppression of the spin upon driver shots, the central hardness H1c is preferably 80 or less, more preferably 75 or less, and even more preferably 70 or less. The central hardness H1c is measured by pressing a JIS-C type hardness scale at a central point of a cut plane of the hemisphere obtained by cutting the center. For the measurement, a type P1 auto loading durometer manufactured by Kobunshi Keiki Co., Ltd., provided with a JIS-C type spring hardness tester is used.

The surface hardness H1s of the center is preferably 45 or more, more preferably 50 or more, and even more preferably 55 or more in JIS-C hardness. If the surface hardness H1s is 45 or more, the resilience performance improves. In light of the shot feeling, the surface hardness H1s is preferably 95 or less, more preferably 90 or less. The surface hardness H1s is measured by pressing the JIS-C type hardness scale on the surface of the center. For the measurement, a type P1 auto loading durometer manufactured by Kobunshi Keiki Co., Ltd., provided with a JIS-C type spring hardness tester is used.

The difference (H1s-H1c) between the surface hardness H1s and the central hardness H1c is preferably 5 or more, more preferably 8 or more, and even more preferably 12 or more in JIS-C hardness. If the difference (H1s-H1c) between the surface hardness H1s and the central hardness H1c is 5 or more in JIS-C hardness, the spin rate is suppressed and the shot feeling becomes better. In light of the durability of the golf ball, the difference (H1s-H1c) is preferably 35 or less, more preferably 32 or less, and even more preferably 30 or less in JIS-C hardness.

The center contributes to the resilience performance of the golf ball. The center preferably has a diameter of 35.0 mm or greater, more preferably 36.0 mm or greater, and even more preferably 37.0 mm or greater. Using the center having a diameter of 35.0 mm or greater enhances the resilience of the golf ball. In light of forming the envelope layer with a sufficient thickness, the diameter of the center is preferably 41.6 mm or less, and more preferably 41.2 mm or less.

When the center has a diameter in a range from 35.0 mm to 41.6 mm, the compression deformation amount of the center is preferably 2.3 mm or more, more preferably 2.4 mm or more, even more preferably 2.5 mm or more. If the compression deformation amount is 2.3 mm or more, the shot feeling improves. The compression deformation amount of the center is preferably 5.0 mm or less, more preferably 4.5 mm or less, even more preferably 4.0 mm or less. If the compression deformation amount is 5.0 mm or less, the resilience improves.

Upon measurement of the compression deformation amount, the spherical body (center, core or golf ball) is placed on a hard plate made of metal. A cylinder made of metal gradually descends toward the spherical body. The spherical body intervened between the bottom face of the cylinder and the hard plate is deformed. A migration distance of the cylinder, starting from the state in which an initial load of 98 N is applied to the spherical body up to the state in which a final load of 1275 N is applied thereto is the compression deformation amount.

The mass of the center is preferably 25 g or greater and 42 g or less.

The envelope layer preferably has a Shore D hardness Hs of 60 or more, more preferably 62 or more, even more preferably 64 or more. If the Shore D hardness Hs of the envelope layer is 60 or more, the flight performance and shot feeling become better. In light of the shot feeling and durability, the envelope layer preferably has a Shore D hardness Hs of 80 or less, more preferably 75 or less, even more preferably 72 or less. The Shore D hardness Hs of the envelope layer may be measured in accordance with a standard of "ASTM-D 2240-68" by using a type LA1 auto loading durometer manufactured by Kobunshi Keiki Co., Ltd., provided with a Shore D type spring hardness tester. For the measurement, a slab injection molded from an envelope layer composition with a thickness of about 2 mm is used. The slab which has been stored at a temperature of 23° C. for two weeks is used for the measurement. When the measurement is carried out, three pieces of the slab are stacked.

In light of the flight performance, the envelope layer preferably has a thickness Ts of 0.5 mm or more, more preferably 0.7 mm or more, and even more preferably 0.8 mm or more. In light of the shot feeling, the envelope layer preferably has a thickness Ts of 2.4 mm or less, more preferably 2.1 mm or less, and even more preferably 1.7 mm or less.

The compression deformation amount of the spherical body consisting of the center and the envelope layer, in light of the shot feeling, is preferably 2.0 mm or more, more preferably 2.1 mm or more, and even more preferably 2.2 mm or more. In light of the resilience performance, the compression deformation amount is preferably 3.8 mm or less, more preferably 3.7 mm or less, and even more preferably 3.6 mm or less.

In light of the resilience performance, the intermediate layer has a Shore D hardness Hm of 40 or more, more preferably 41 or more, and even more preferably 42 or more. In light of the shot feeling, the intermediate layer preferably has a Shore D hardness Hm of 60 or less, and more preferably 59 or less. The Shore D hardness Hm of the intermediate layer is measured by the same method as that for the hardness Hs of the envelope layer.

The intermediate layer has a thickness Tm less than 1.2 mm. As described later, the hardness of the intermediate layer is less than that of the envelope layer. The intermediate layer is disadvantageous to the coefficient of restitution of the golf ball. Upon driver shots, the center and the envelope layer also deform significantly. By setting the thickness Tm of the intermediate layer to be less than 1.2 mm, the intermediate layer does not provide a significantly adverse effect to the coefficient of restitution upon driver shots, even if the intermediate layer is soft. The intermediate layer with a thickness Tm less than 1.2 mm does not impair the flight performance of the golf ball. In light of the flight performance, the thickness Tm of the intermediate layer is preferably 1.1 mm or less, and more preferably 1.0 mm or less. In light of the shot feeling, the thickness Tm of the intermediate layer is preferably 0.1 mm or more, more preferably 0.2 mm or more, and even more preferably 0.3 mm or more.

In light of the shot feeling, the compression deformation amount of the spherical body (core) comprising the center and the envelope layer is preferably 2.3 mm or more, more preferably 2.4 mm or more, and even more preferably 2.5 mm or more. In light of the resilience performance, the compression deformation amount is preferably 4.0 mm or less, more preferably 3.9 mm or less, even more preferably 3.8 mm or less.

The golf ball of the present invention may have a reinforcing layer between the intermediate layer and the cover. The reinforcing layer adheres firmly to the intermediate layer as well as to the cover. The reinforcing layer suppresses delamination of the cover from the intermediate layer. As described later, the golf ball of the present invention preferably comprises a thin cover. When the golf ball with a thin cover is hit with an edge of a clubface, a wrinkle easily generates. The reinforcing layer suppresses the generation of the wrinkle.

In light of suppressing the wrinkle, the reinforcing layer preferably has a thickness of 3 µm or greater, and more preferably 5 µm or greater. In order to facilitate the formation of the reinforcing layer, the reinforcing layer preferably has a thickness of 30 µm or less, more preferably 20 µm or less, and even more preferably 10 µm or less. The thickness is measured by observing a cross section of the golf ball with a microscope. When the intermediate layer has concavities and convexities on its surface by surface roughening, the thickness of the reinforcing layer is measured at the top of the convex part.

In light of suppressing the wrinkle, the reinforcing layer preferably has a pencil hardness of 4B or harder, and more preferably B or harder. In light of reduced loss of the power transmission from the cover to the intermediate layer upon a hit of the golf ball, the reinforcing layer preferably has a pencil hardness or 3H or softer. The pencil hardness is measured according to the standard of "JIS K5400".

The Shore D hardness Hc of the cover of the golf ball of the present invention is less than 40. Use of the soft cover can provide excellent controllability upon a shot with a short iron. In light of the controllability, the Shore D hardness Hc is preferably 38 or less, and more preferably 36 or less. If the hardness Hc is too small, the flight performance on driver shots is insufficient. In this light, the hardness Hc is preferably 10 or more, more preferably 15 or more, and even more preferably 20 or more. The hardness Hc of the cover is measured by the same method as that for the hardness Hs of the envelope layer.

The cover preferably has a thickness Tc of 1.0 mm or less. As described the above, the soft cover is used. The cover is disadvantageous to the coefficient of restitution of the golf ball. Upon driver shots, the center and the envelope layer also deform significantly. By setting the thickness Tc of the cover to be 1.0 mm or less, the cover does not provide a significantly adverse effect to the coefficient of restitution upon driver shots, even if the cover is soft. The cover with a thickness Tc of 1.0 mm or less does not impair the flight performance of the golf ball. In light of the flight performance, the thickness Tc is preferably 0.8 mm or less, and more preferably 0.5 mm or less. In light of controllability upon a shot with a short ion, the thickness Tc of the cover is preferably 0.1 mm or more, more preferably 0.2 mm or more, and even more preferably 0.3 mm or more.

The golf ball of the present invention is configured to satisfy the following mathematical formula.

$$Hs > Hm > Hc$$

Hs: Shore D hardness of the envelope layer
Hm: Shore D hardness of the intermediate layer
Hc: Shore D hardness of the cover In the golf ball of the present invention, the hardness Hs of the envelope layer is great. The envelope layer provides an outer-hard and inner-soft structure. The envelope layer with a great hardness suppresses the spin when the golf ball is hit with a driver. The envelope layer contributes to the flight performance upon a shot with a driver. In the golf ball of the present invention, the hardness Hc of the cover is small. When the golf ball with the cover having a small hardness is hit with a short iron, a high spin rate is obtained. The cover with a small hardness contributes to the controllability upon a shot with a short iron. In the golf ball of the present invention, the hardness Hm of the intermediate layer is between the hardness Hs of the envelope layer and the hardness Hc of the cover. If the intermediate layer is not provided, the hardness distribution has a great gap at the boundary between the envelope layer and the cover. In the golf ball with the intermediate layer, the hardness distribution does not have such a great gap. The intermediate layer contributes to the shot feeling. The golf ball of the present invention has excellent flight performance, excellent controllability and excellent shot feeling.

The mass of the golf ball of the present invention ranges from 40 g to 50 g. In light of obtaining great inertia, the mass is preferably 44 g or more, more preferably 45.00 g or more. In light of satisfying a regulation of USGA, the mass is preferably 45.93 g or less.

The golf ball of the present invention has a diameter ranging from 40 mm to 50 mm. In light of satisfying a regulation of US Golf Association (USGA), the diameter is preferably 42.67 mm or more. In light of prevention of the resistance of air, the diameter is preferably 44 mm or less, and more preferably 42.80 mm or less.

When the golf ball has a diameter ranging from 40 mm to 45 mm, the compression deformation amount of the golf ball of the present invention is preferably 1.9 mm or greater, more preferably 2.0 mm or greater, even more preferably 2.1 mm or greater. If the compression deformation amount is 1.9 or more, the golf ball with a good shot feeling can be obtained. The compression deformation amount is preferably 3.5 mm or less, more preferably 3.0 mm or less, and even more preferably 2.7 mm or less. If the compression deformation amount is 3.5 mm or less, the resilience improves.

In light of the flight performance, controllability and shot feeling, the difference (Hs−Hm) between the Shore D hardness Hs of the envelope layer and the Shore D hardness Hm of the intermediate layer is preferably 3 or more, more preferably 4 or more, and is preferably 30 or less, more preferably 20 or less.

In light of the flight performance, controllability and shot feeling, the difference (Hm-Hc) between the Shore D hardness Hm of the intermediate layer and the Shore D hardness Hc of the cover is preferably 5 or more, more preferably 10 or more, even more preferably 15 or more, and is preferably 35 or less, more preferably 30 or less, even more preferably 25 or less.

In light of the flight performance, controllability and shot feeling, the sum (Tm+Tc) of the thickness Tm of the intermediate layer and the thickness Tc of the cover is preferably 1.6 mm or less, more preferably 1.4 mm or less. In light of facilitating the formation of the intermediate layer and the cover, the sum (Tm+Tc) is preferably 0.2 mm or more, and more preferably 0.3 mm or more.

The total number of the dimples formed on the surface of the golf ball of the present invention is preferably 200 or more and 500 or less. If the total number of the dimples is less than 200, the dimple effect is hardly obtained. On the other hand, if the total number of the dimples exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

(2) Intermediate Layer Composition

The intermediate layer of the golf ball of the present invention is formed from an intermediate layer composition containing (A) a modified polyester elastomer having a Shore A hardness of 95 or less; (B) a binary ionomer resin having a Shore D hardness of 65 or more, a flexural modulus of 300 MPa or more, and a melt flow rate (190° C., 2.16 kg) of 1.0 g/10 min or more; and, if desired, (C) a thermoplastic resin other than (A) component and (B) component.

First, (A) the modified polyester elastomer having a Shore A hardness of 95 or less will be explained. (A) The modified polyester elastomer used in the present invention is preferably obtained by carrying out a reaction between (a-3) an unsaturated carboxylic acid or a derivative thereof and (a-2) a polyester elastomer in a presence of (a-1) a radical generator. In the modification reaction, it is considered that the graft reaction of (a-3) the unsaturated carboxylic acid or a derivative thereof to (a-2) the polyester elastomer mainly occurs with some other reactions such as a reaction where the unsaturated carboxylic acid or a derivative is added to the terminal of the polyester elastomer, an ester exchange reaction, and decomposition. (A) The modified polyester elastomer preferably has (a-3) the unsaturated carboxylic acid or a derivative thereof which are grafted in a content ranging from 0.03 mass % to 20 mass %. The grafting content more preferably ranges from 0.06 mass % to 4 mass %, even more preferably 0.08 mass % to 1.5 mass %. If the grafting content falls within the above range, the dispersibility into (B) the binary ionomer resin improves and the durability of the obtained golf ball becomes better.

Although many polyester elastomers are known, as (a-2) the polyester elastomer, preferred is a polyester elastomer composed of an aromatic polyester component as a hard segment and a polyalkylene glycol or aliphatic polyester component as a soft segment. In the present invention, particularly preferred is a polyester polyether block copolymer having an aromatic polyester component as the hard segment and a polyalkylene glycol component as the soft segment. The content of the polyalkylene glycol component is preferably in a range from 5 mass % to 90 mass %, more preferably 30 mass % to 80 mass %, and even more preferably 55 mass % to 80 mass % in the block copolymer produced. In general, it tends to be difficult to produce the polymer having a high content of the polyalkylene glycol component by a condensation polymerization. Further, it is also difficult that the thermoplastic resin consisting of the polymer having a high content of the polyalkylene glycol as a material and the ionomer resin exhibits an appropriate hardness and a high rebound resilience. On the contrary, if the content of the polyalkylene glycol component is low, the elastic property becomes low. Thus, it is difficult that the intermediate layer composition consisting of the polymer having a low content of the polyalkylene glycol as a material and the ionomer resin exhibits an appropriate softness and a high rebound resilience. Further, the dispersibility into (B) the binary ionomer resin becomes low.

The polyester polyether block copolymer can be produced by preparing an oligomer by esterification or an ester exchange reaction in a conventional method, using an aliphatic diol or alicyclic diol each having 2 to 12 carbon atoms, and an aromatic dicarboxylic acid, aliphatic dicarboxylic acid or an alkyl ester thereof as a component forming the hard segment; and a polyalkylene glycol having a weight average molecular weight from 400 to 6,000 as a component forming the soft segment; and condensation polymerizing the obtained oligomer. Examples of the aliphatic diol or alicyclic diol each having 2 to 12 carbon atoms include ethylene glycol, propylene glycol, trimethylene glycol, 1,4-butane diol, 1,4-cyclohexanediol, and 1,4-cyclohexanedimethanol. Among them, preferred is 1,4-butane diol or ethylene glycol, particularly preferred is 1,4-butane diol. These diols may be used in combination of two or more, if desired.

As the aromatic dicarboxylic acid, those which are generally used as a raw material for polyester elastomers can be used. Examples thereof include terephthalic acid, isophthalic acid, phthalic acid, and 2,6-naphthalene dicarboxylic acid. The aromatic dicarboxylic acid preferably includes terephthalic acid or 2,6-naphthalene dicarboxylic acid, more preferably terephthalic acid. These aromatic dicarboxylic acids may be used in combination of two or more. Examples of the alkyl esters of the aromatic dicarboxylic acids include dimethyl esters and diethyl esters of the aromatic dicarboxylic acids. Preferred is dimethyl terephthalate or dimethyl 2,6-naphthalate. The alicyclic dicarboxylic acid preferably includes cyclohexane dicarboxylic acid. The alkyl ester thereof preferably includes a dimethyl ester or a diethyl ester. In addition to the above components, a small amount of a tri-functional alcohol, tricarboxylic acid, or esters thereof may be copolymerized, if desired. Also, an aliphatic dicarboxylic acid such as adipic acid or its dialkyl ester may be used as a comonomer.

The polyalkylene glycol having a weight-average molecular weight ranging from 400 to 6,000 is preferably used. The weight-average molecular weight is more preferably 500 to 4,000, even more preferably 600 to 3,000. In general, if the polyalkylene glycol having a low weight-average molecular weight is used, it becomes difficult that the resultant polyester elastomer exhibit the elastic property. On the contrary, the polyalkylene glycol having an excessively high weight-average molecular weight tends to cause the phase separation of the reaction system, and the properties of the resultant polyester elastomer tend to be lowered. Examples of the polyalkylene glycol include polyethylene glycol, poly(1,2- and 1,3-propylene ether)glycol, polytetramethylene glycol, and polyhexamethylene glycol. The commercial products of polyester elastomers include "Primalloy" (Mitsubishi Chemical Corporation), "Pelprene" (Toyobo Co., Ltd.), and "Hytrel" (Du Pont-Toray Co., Ltd.), etc.

(a-2) The polyester elastomer used in the present invention preferably has polybutylene terephthalate as the hard segment and polytetramethylene glycol as the soft segment.

Examples of (a-3) the unsaturated carboxylic acid used for the modification of the polyester elastomer include unsaturated carboxylic acids such as acrylic acid, maleic acid, fumaric acid, tetrahydrophtalic acid, itaconic acid, citraconic acid, crotonic acid, and isocrotonic acid, which may have an alkyl group, a halogen atom or the like as a substituent. Examples of the derivative thereof include an ester and an anhydride thereof. The anhydride having an unsaturated bond in the side chain can be also used. Examples include unsaturated carboxylic anhydrides such as (2-octene-1-yl)succinic anhydride, (2-dodecene-1-yl)succinic anhydride, (2-octadecene-1-yl)succinic anhydride, maleic anhydride, 2,3-dimethylmaleic anhydride, bromomaleic anhydride, dichloromaleic anhydride, citraconic anhydride, itaconic anhydride, 1-butene-3,4-dicarboxylic acid anhydride, 1-cyclopentene-1, 2-dicarboxylic acid anhydride, 1,2,3,6-tetrahydrophthalic anhydride, 3,4,5,6-tetrahydrophthalic anhydride, exo-3,6-epoxy-1,2,3,6-tetrahydrophthalic anhydride, 5-norbornene-2,3-dicarboxylic anhydride, methyl-5-norbornene-2,3-dicarboxylic anhydride, endo-bicyclo[2.2.2]oct-5-ene-2,3-dicarboxylic anhydride, and bicyclo[2.2.2]oct-7-ene-2,3,5,6-tetracarboxylic anhydride; and unsaturated carboxylic acid esters such as methyl(meth)acrylate, ethyl(meth)acrylate, propyl(meth)acrylate, butyl(meth)acrylate, hexyl (meth)acrylate, octyl(meth)acrylate, 2-ethylhexyl(meth)acrylate, lauryl (meth)acrylate, stearyl(meth)acrylate, glycidyl(meth)acrylate, dimethyl maleate, 2-ethylhexyl maleate, 2-hydroxyethyl methacrylate. Among them, preferred is an anhydride of the unsaturated carboxylic acid, particularly preferred is an anhydride of maleic acid. These compounds having unsaturated bonds are suitably selected according to the type of the polyester elastomer to be modified and the modification conditions and may be used in combination of two or more.

As (a-1) the radical generator, various compounds can be used. Examples of the radical generator include organic or inorganic peroxides such as t-butyl hydroperoxide, cumene hydroperoxide, 2,5-dimethylhexane 2,5-dihyroperoxide, 2,5-dimethyl-2,5-bis(t-butyloxy)hexane, 3,5,5-trimethylhexanoyl peroxide, t-butyl peroxybenzoate, benzoyl peroxide, dicumyl peroxide, 1,3-bis(t-butylperoxyisopropyl)benzene, dibutyl peroxide, methyl ethyl ketone peroxide, potassium peroxide, and hydrogen peroxide; azo compounds such as 2,2'-azobisisobutyronitrile, 2,2'-azobis(isobutylamide)dihalide, 2,2'-azobis[2-methyl-N-(2-hydroxyethyl)propionamide], and azodi-t-butane; and carbon radical generators such as dicumyl. The radical generators are suitably selected according to the type of the polyester elastomer to be modified, the type of the unsaturated carboxylic acid or derivative thereof and the modification conditions, and may be used in combination of two or more.

In the modification reaction, the blending ratio of (a-3) component preferably ranges from 0.01 mass % to 30 mass %, more preferably 0.05 mass % to mass %, even more preferably 0.1 mass % to 2 mass %, most preferably 0.1 mass % to 1 mass % with respect to 100 mass % of (a-2) component. The blending ratio of (a-1) component preferably ranges from 0.001 mass % to 3 mass %, more preferably 0.005 mass % to 0.5 mass %, even more preferably 0.01 mass % to 0.2 mass %, most preferably 0.01 mass % to 0.1 mass % with respect to 100 mass % of (a-2) component. In most preferable modification, the blending ratio of (a-3) component ranges from 0.1 mass % to 1 mass % and the blending ratio of (a-1) component ranges from 0.01 mass % to 0.1 mass %, with respect to 100 mass % of (a-2) component.

In general, if the blending amount of (a-3) component is low, the modification degree becomes small, and thus the intermediate layer composition obtained by blending the resultant polyester elastomer and the ionomer resin does not tend to exhibit a sufficient abrasion resistance. On the other hand, if the blending amount is excessive, the resultant polyester elastomer has a low viscosity when melt, and thus it is difficult to mold the intermediate layer composition obtained by blending the resultant polyester elastomer with the ionomer resin. Further, if the blending amount of (a-1) component is too low, the modification does not occur sufficiently, and thus the sufficient wear resistance is hardly exhibited. On the contrary, if the blending amount is too much, the resultant polyester elastomer has a low viscosity when melt, and thus the moldability becomes worse.

The modification for producing the modified polyester elastomer using (a-1) component, (a-2) component, and (a-3) component is conducted by a known method such as a melt kneading method, solution method and suspended dispersion method. Conventionally, the melt kneading method is preferable. In case of the melt kneading method, (a-2) component, (a-3) component, and (a-1) component may be uniformly mixed in a predetermined blending ratio using a Henschel mixer, a ribbon blender, a V-shape blender or the like and then the resultant mixture may be melt-kneaded using a Banbury mixer, a kneader, a roll, or a single- or multi- (e.g. twin-) screw kneading extruder. If necessary, (a-3) component and (a-2) component may be solved in a solvent for the modification reaction. The melt kneading is preferably performed at the temperature ranging from 100° C. to 300° C., more preferably 120° C. to 280° C., even more preferably 150° C. to 250° C., so as to avoid the thermal degradation of the resins.

(A) The modified polyester elastomer used in the present invention preferably has a slab hardness of 95 or less, more preferably 93 or less, even more preferably 91 or less in Shore A hardness, and preferably has a slab hardness of 70 or more, more preferably 75 or more, even more preferably 80 or more in Shore A hardness. If the slab hardness of the modified polyester elastomer falls within the above range, the intermediate layer composition tends to have a hardness in a desired range, and shows a good balance with the resilience. The slab hardness of the modified polyester elastomer means a hardness obtained by measuring the modified polyester elastomer formed in a sheet form, and can be measured by a later-described method.

Next, (B) the binary ionomer resin will be explained. The binary ionomer resin is one prepared by neutralizing at least a part of carboxyl groups in a binary copolymer composed of an olefin and an α,β-unsaturated carboxylic acid having 3 to 8 carbon atoms with a metal ion. The olefin preferably includes an olefin having 2 to 8 carbon atoms. Examples of the olefin include ethylene, propylene, butene, pentene, hexene, heptene, and octene. Among them, ethylene is more preferred. Examples of the α,β-unsaturated carboxylic acid are acrylic acid, methacrylic acid, fumaric acid, maleic acid and crotonic acid. Among these, acrylic acid and methacrylic acid are particularly preferred. Among them, as (B) the binary ionomer resin, preferred is a metal ion-neutralized product of the binary copolymer composed of ethylene-(meth)acrylic acid.

The content of α,β-unsaturated carboxylic acid having 3 to 8 carbon atoms in (B) the binary ionomer resin is preferably 15 mass % or more, more preferably 16 mass % or more, even more preferably 17 mass % or more, and is preferably 30 mass % or less, more preferably 25 mass % or less. If the content of α,β-unsaturated carboxylic acid is 15 mass % or more, the resilience and hardness become better, while if the acid content is 30 mass % or less, the balance among the resilience, moldability and hardness becomes better.

Examples of a metal (ion) used for neutralizing the binary copolymer include: monovalent metals (ions) such as sodium, potassium, lithium, or the like; divalent metals (ions) such as magnesium, calcium, zinc, barium, cadmium, or the like; trivalent metals (ions) such as aluminum or the like; and other metals (ions) such as tin, zirconium, or the like. Among these metals (ions), sodium, zinc and magnesium (ions) are preferably used because they provide excellent resilience, durability, or the like.

The degree of neutralization of the carboxylic groups contained in the binary ionomer resin is preferably 20 mole % or more, more preferably 30 mole % or more, and is preferably 90 mole % or less, more preferably 85 mole % or less. If the degree of neutralization is 20 mole % or more, the intermediate layer has a better resilience and durability. If the degree of neutralization is 90 mole % or less, the fluidity of the intermediate layer composition becomes better (resulting in good moldability). It is noted that the degree of neutralization of the carboxylic groups in the ionomer resin can be calculated by the following expression.

Degree of neutralization(mol %)=(the number of moles of carboxylic groups neutralized in the ionomer resin/the number of moles of all carboxylic groups contained in the ionomer resin)× 100

Specific examples of the binary ionomer resin include trade name "Himilan® (e.g. Himilan 1605 (Na), Himilan 1706 (Zn), Himilan 1707 (Na), Himilan AM7311 (Mg))" commercially available from Du Pont-Mitsui Polychemicals Co., Ltd.

Further, examples include "Surlyn®(e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6120 (Mg), Surlyn 7930 (Li), Surlyn 7940 (Li), Surlyn AD8546 (Li))" commercially available from E.I. du Pont de Nemours and Company.

Further, examples include "Iotek®(e.g. Iotek 8000 (Na), Iotek 8030 (Na), Iotek 7010 (Zn), Iotek 7030 (Zn))" commercially available from ExxonMobil Chemical Corporation.

The binary ionomer resins may be used alone or as a mixture of at least two of them. It is noted that Na, Zn, Li, and Mg described in the parentheses after the trade names indicate metal types of neutralizing metal ions for the metal-neutralized copolymer.

The flexural modulus of (B) the binary ionomer resin is preferably 300 MPa or more, more preferably 310 MPa or more, and even more preferably 330 MPa or more, and is preferably 600 MPa or less, more preferably 550 MPa or less, and even more preferably 500 MPa or less. If the flexural modulus of (B) the binary ionomer resin is too low, the elastic modulus of the intermediate layer becomes low, and the effects of increasing the launch angle and reducing the spin rate become small. On the other hand, if the flexural modulus of (B) the binary ionomer resin is too high, the elastic modulus of the intermediate layer becomes excessively high, and the durability and the shot feeling of the golf ball tend to deteriorate.

The melt flow rate (190° C., 2.16 kg) of the binary ionomer resin is preferably 1.0 g/10 min or more, more preferably 1.5 g/10 min or more, and even more preferably 2.0 g/10 min or more, and is preferably 30 g/10 min or less, more preferably 25 g/10 min or less, and even more preferably 20 g/10 min or less. If the melt flow rate (190° C., 2.16 kg) of the binary ionomer resin is 1.0 g/10 min or more, the fluidity of the intermediate layer composition becomes good, and it is possible to make a thin-walled intermediate layer. Thus, the spin rate when hitting a driver shot is reduced to give a great flight distance. If the melt flow rate (190° C., 2.16 kg) of the binary ionomer resin is 30 g/10 min or less, the durability of the obtained golf ball becomes better.

The binary ionomer resin preferably has a slab hardness of 65 or more, more preferably 66 or more, even more preferably 67 or more, and preferably has a slab hardness of 80 or less, more preferably 75 or less, even more preferably 70 or less in Shore D hardness. If the slab hardness of the binary ionomer resin is 65 or more in Shore D hardness, the intermediate layer becomes harder and thus the effect of the high launch angle and low spin rate becomes larger. If the slab hardness of the binary ionomer resin is 80 or less in Shore D hardness, the intermediate layer does not become excessively hard and the durability of the golf ball becomes better.

(C) Other Thermoplastic Resins than (A) Component and (B) Component

The intermediate layer composition used in the present invention may further comprise other thermoplastic resins than (A) component and (B) component, in addition to (A) component and (B) component. Examples of (C) component include polyurethane, polyolefin, polyester, polyamide, polystyrene, polycarbonate, polyacetal, modified poly(phenyleneether), polyimide, polysulfone, polyethersulfone, poly (phenylenesulfide), polyarylate, polyamideimide, polyetherimide, polyetheretherketone, polyetherketone, polytetrafluororoethylene, polyaminobismaleimide, polybisamidetriazole, an acrylonitrile-butadiene-styrene copolymer, an acrylonitrile-styrene copolymer, an acrylonitrile-EPDM-styrene copolymer.

Specific examples of (C) component are a thermoplastic polyamide elastomer having a trade name "Pebax®(e.g. "Pebax 2533")" commercially available from Arkema Inc., a thermoplastic polyurethane elastomer having a trade name "Elastollan®(e.g. "Elastollan XNY85A")" commercially available from BASF Japan Ltd., a thermoplastic polyester elastomer having a trade name "Hytrel®(e.g. "Hytrel 3548"

and "Hytrel 4047")" commercially available from Du Pont-Toray Co., Ltd., a thermoplastic polystyrene elastomer having a trade name "Rabalon®(e.g. "Rabalon T3221C")" commercially available from Mitsubishi Chemical Corporation, or the like.

In the present invention, the intermediate layer composition contains, as a resin component, (A) the modified polyester elastomer in an amount of 30 mass % to 70 mass %, (B) the binary ionomer resin in an amount of 70 mass % to 30 mass %, and (C) component in an amount of 0 mass % to 50 mass %, provided that a total content of (A) component, (B) component, and (C) component is 100 mass %. The contents of (A) component and (B) component preferably range from 35 mass % to 65 mass %, more preferably from 40 mass % to 60 mass %, respectively. If the contents of (A) component and (B) component fall within the above range, the intermediate layer has an appropriate rigidity and the golf ball has the high launch angle and low spin rate. Therefore, the golf ball travels a great distance. In addition, the shot feeling is improved.

The content of (C) component in the intermediate layer composition is preferably 0.1 mass % or more, more preferably 0.15 mass % or more, even more preferably 0.2 mass % or more, and is preferably 50 mass % or less, more preferably 45 mass % or less, even more preferably 40 mass % or less. If the content of (C) component falls within the above range, the intermediate layer composition has a desired hardness without lowering the mechanical properties.

The intermediate layer composition may further contain pigment components such as a white pigment (for example, titanium oxide) and a blue pigment; a mass adjusting agent; a dispersant; an antioxidant; an ultraviolet absorber; a light stabilizer; a fluorescent material or a fluorescent brightener or the like, as long as the performance of the golf ball of the present invention does not deteriorate.

Examples of the mass adjusting agent are metals such as gold, tungsten, molybdenum, lead, copper, iron, cast iron, pig iron, zinc, titanium, aluminum, zirconium; metal oxides such as aluminum oxide, bismuth oxide, cerium oxide, copper oxide, tin oxide, titanium oxide, yttrium oxide, zinc oxide, silica; barium sulfate; calcium carbonate; talc; montmorillonite; and mica. The mass adjusting agent may be used alone or in combination of two or more of them.

The blending amount of the mass adjusting agent is preferably 1 part by mass or more, more preferably 2 parts by mass or more, even more preferably 3 parts by mass or more, and is preferably 50 parts by mass or less, more preferably 47 parts by mass or less, even more preferably 44 parts by mass or less. If the blending amount of the mass adjusting agent is 1 part by mass or more, the density of the intermediate layer can be more easily adjusted. If the blending amount is 50 parts by mass or less, the dispersibility of the mass adjusting agent into the resin component becomes better.

The intermediate layer composition can be obtained, for example, by dry blending (A) the modified polyester elastomer and (B) the binary ionomer resin, followed by extruding and pelletizing. The dry blending may be carried out using for example, a mixer capable of blending a raw material in the form of pellet, more preferably a tumbler type mixer. In addition to the dry blending, the materials may be supplied respectively by the respective feeding machines. Extruding can be carried out by publicly known extruders such as a single-screw kneading extruder, a twin-screw kneading extruder, and a twin-single kneading extruder. The extruding condition is not particularly limited. For example, in the case of extruding with a twin-screw kneading extruder, the preferable conditions are screw diameter=45 mm; screw revolutions=50 rpm to 400 rpm; screw L/D=35 or less, and die temperature; 140° C. to 250° C. If desired, the modification of the polyester elastomer and the blending of the binary ionomer resin with the resultant modified polyester elastomer can be conducted at the same time by adding the binary ionomer resin as well as the radical generator and the unsaturated carboxylic acid to the polyester elastomer when preparing (A) the modified polyester elastomer.

The melt flow rate (230° C., 2.16 kg) of the intermediate layer composition is preferably 3 g/10 min or more, more preferably 5 g/10 min or more, and even more preferably 7 g/10 min or more, and is preferably 30 g/10 min or less, more preferably 27 g/10 min or less, and even more preferably 25 g/10 min or less. If the melt flow rate is 3 g/10 min or more, since the moldability of the intermediate layer is enhanced, it is easier to make a thin-walled intermediate layer.

The intermediate layer composition preferably has a flexural modulus of 150 MPa or more, more preferably 155 MPa or more, even more preferably 160 MPa or more, and preferably has a flexural modulus of 450 MPa or less, more preferably 430 MPa or less, even more preferably 400 MPa or less. If the flexural modulus of the intermediate layer composition is 150 MPa or more, it is possible to make the golf ball have an outer-hard and inner soft structure, resulting in a great flight distance. If the flexural modulus is 450 MPa or less, the obtained golf ball becomes appropriately soft and the shot feeling becomes better.

The intermediate layer composition preferably has a rebound resilience of 55% or more, more preferably 56% or more, even more preferably 57% or more. If the rebound resilience of the intermediate layer composition is 55% or more, the obtained golf ball travels a great distance. Herein, the flexural modulus and the rebound resilience is the flexural modulus and the rebound resilience of the intermediate layer composition molded into a sheet form and are measured by a method described later.

The intermediate layer composition preferably has a maximum loss factor (tan δ) of 0.08 or less, more preferably 0.07 or less, even more preferably 0.06 or less, and preferably has a maximum loss factor (tan δ) of 0.01 or more, more preferably 0.02 or more, even more preferably 0.03 or more, between −20° C. and 0° C. If the maximum value of the loss factor (tan δ) between −20° C. and 0° C. falls within the above range, the desirable resilience is obtained.

The intermediate layer composition preferably has a slab hardness of 40 or more, more preferably 41 or more, even more preferably 42 or more, and preferably has a slab hardness of 60 or less, more preferably 59 or less, even more preferably 58 or less in Shore D hardness. If the intermediate layer composition has the slab hardness of 40 or more in Shore D, the intermediate layer has higher rigidity and the golf ball having more excellent resilience (distance) is obtained. On the other hand, if the intermediate layer composition has the slab hardness of 60 or less in Shore D hardness, the obtained golf ball has higher durability. Herein, the slab hardness of the intermediate layer means the hardness of the intermediate layer composition molded into a sheet form and is measured by a later described method.

The melt flow rate, flexural modulus, rebound resilience, and slab hardness of the intermediate layer composition can be adjusted by appropriately selecting kinds, content or the like of (A) component, (B) component and (C) component.

(3) Center Composition

For the center of the golf ball of the present invention, a conventionally known rubber composition (hereinafter simply referred to as "center rubber composition" occasionally) may be employed, and it can be molded by, for example, heat-pressing a rubber composition containing a base rubber, a crosslinking initiator, a co-crosslinking agent, and a filler.

As the base rubber, a natural rubber and/or a synthetic rubber such as a polybutadiene rubber, a natural rubber, a polyisoprene rubber, a styrene polybutadiene rubber, and ethylene-propylene-diene terpolymer (EPDM) may be used. Among them, typically preferred is the high cis-polybutadiene having cis-1,4-bond in a proportion of 40% or more, more preferably 70% or more, even more preferably 90% or more in view of its superior repulsion property.

The center of the golf ball of the present invention is preferably formed by crosslinking a rubber composition including a polybutadiene rubber.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butyl peroxy)-3,3,5-trimethylcyclohexane, 2,5-di methyl-2,5-di(t-butylperoxy)hexane, and di-t-butyl peroxide. Among them, dicumyl peroxide is preferable. An amount of the crosslinking initiator to be blended in the rubber composition is preferably 0.3 part by mass or more, more preferably 0.4 part by mass or more, and is preferably 5 parts by mass or less, more preferably 3 parts by mass or less based on 100 parts by mass of the base rubber. If the amount is less than 0.3 part by mass, the center becomes too soft, and the resilience tends to be lowered, and if the amount is more than 5 parts by mass, the amount of the co-crosslinking agent must be increased in order to obtain the appropriate hardness, and thus the resilience is likely to be lowered.

The co-crosslinking agent is not particularly limited as long as it has the effect of crosslinking a rubber molecule by graft polymerization with a base rubber molecular chain; for example, α,β-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience.

The amount of the co-crosslinking agent to be used is preferably 10 parts or more, more preferably 15 parts or more, even more preferably 20 parts or more, and is preferably 55 parts or less, more preferably 50 parts or less, even more preferably 48 parts or less based on 100 parts of the base rubber by mass. If the amount of the co-crosslinking agent to be used is less than 10 parts by mass, the amount of the crosslinking initiator must be increased to obtain an appropriate hardness, which tends to lower the resilience. On the other hand, if the amount of the co-crosslinking agent to be used is more than 55 parts by mass, the center becomes too hard, so that the shot feeling may be lowered.

The filler contained in the center rubber composition is mainly blended as a specific gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 0.5 part or more, more preferably 1 part or more, and is preferably 30 parts or less, more preferably 20 parts or less based on 100 parts of the base rubber by mass. If the amount of the filler to be blended is less than 0.5 part by mass, it becomes difficult to adjust the weight, while if it is more than 30 parts by mass, the weight ratio of the rubber component becomes small and the resilience tends to be lowered.

As the center rubber composition, an organic sulfur compound, an antioxidant or a peptizing agent may be blended appropriately in addition to the base rubber, the crosslinking initiator, the co-crosslinking agent and the filler.

As the organic sulfur compound, diphenyl disulfide or a derivative thereof may be preferably used. Examples of the diphenyl disulfide or the derivative thereof include diphenyl disulfide; a mono-substituted diphenyl disulfide such as bis (4-chlorophenyl)disulfide, bis(3-chlorophenyl)disulfide, bis (4-bromophenyl)disulfide, bis(3-bromophenyl)disulfide, bis (4-fluorophenyl)disulfide, bis(4-iodophenyl)disulfide and bis (4-cyanophenyl)disulfide; a di-substituted diphenyl disulfide such as bis(2,5-dichlorophenyl)disulfide, bis(3,5-dichlorophenyl)disulfide, bis(2,6-dichlorophenyl)disulfide, bis(2, 5-dibromophenyl)disulfide, bis(3,5-dibromophenyl)disulfide, bis(2-chloro-5-bromophenyl)disulfide, and bis(2-cyano-5-bromophenyl)disulfide; a tri-substituted diphenyl disulfide such as bis(2,4,6-trichlorophenyl)disulfide, and bis (2-cyano-4-chloro-6-bromophenyl)disulfide; a tetra-substituted diphenyl disulfide such as bis(2,3,5,6-tetra chlorophenyl)disulfide; a penta-substituted diphenyl disulfide such as bis(2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide and bis(pentabromophenyl) disulfide are preferably used since a golf ball having particularly high resilience can be obtained. The amount of the diphenyl disulfide or the derivative thereof to be blended is preferably 0.1 part by mass or more, more preferably 0.3 part by mass or more, and is preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

(4) Envelope Layer Composition

An envelope layer composition containing a resin component is preferably used for the envelope layer. Examples of the resin component include ionomer resins, styrene block-containing thermoplastic elastomers, thermoplastic polyurethane elastomers, thermoplastic polyamide elastomers, thermoplastic polyester elastomers and thermoplastic polyolefin elastomers. Among these, ionomer resins are preferred as the resin component. Ionomer resins are highly elastic. As described above, the intermediate layer and the cover of the golf ball are thin. When the golf ball is hit with a driver, the envelope layer significantly deforms due to the thinness of the intermediate layer and the cover. The envelope layer including an ionomer resin contributes to the resilience performance upon a shot with a driver.

An ionomer resin and another resin may be used in combination. In this case, in light of the resilience performance, the ionomer resin is the principal component of the resin component. The content of the ionomer resin in the resin component is preferably 50 mass % or more, more preferably 70 mass % or more, and even more preferably 85 mass % or more.

Examples of the ionomer resin include, for example, one prepared by neutralizing at least a part of carboxyl croups in a binary copolymer composed of an olefin and an α,β-unsaturated carboxylic acid having 3 to 8 carbon atoms with a metal ion, one prepared by neutralizing at least a part of carboxyl groups in a ternary copolymer composed of an olefin, an α,β-unsaturated carboxylic acid having 3 to 8 carbon atoms and an α,β-unsaturated carboxylic acid ester, or a mixture of them. The olefin preferably includes an olefin having 2 to 8 carbon atoms. Examples of the olefin include ethylene, propylene, butene, pentene, hexene, heptene and octene. Among them, ethylene is more preferred. Examples of the α,β-unsaturated carboxylic acid having 3 to 8 carbon atoms are acrylic acid, methacrylic acid, fumaric acid, maleic acid and crotonic acid. Among these, acrylic acid or methacrylic acid is particularly preferred. Examples of the α,β-unsaturated carboxylic acid ester are methyl, ethyl, propyl, n-butyl, isobutyl ester and the like of acrylic acid, methacrylic acid, fumaric acid and maleic acid. Particularly, acrylic acid ester and methacrylic acid ester are preferred. Among them, as the ionomer resin, preferred are a metal ion-neutralized product of the binary copolymer composed of ethylene-(meth)acrylic acid and a metal ion-neutralized product of the ternary copolymer composed of ethylene-(meth)acrylic acid-(meth)acrylic acid ester.

Specific examples of the ionomer resin include trade name "Himilan® (e.g. Himilan 1555 (Na), Himilan 1557 (Zn), Himilan 1605 (Na), Himilan 1706 (Zn), Himilan 1707 (Na), Himilan AM3711 (Mg))", and specific examples of the ternary ionomer resin include "Himilan 1856 (Na) and Himilan 1855 (Zn)" commercially available from Du Pont-Mitsui Polychemicals Co., Ltd.

Further, examples of the ionomer resin include "Surlyn® (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))", and specific examples of the ternary ionomer resin include "Surlyn 8120 (Na), Surlyn 8320 (Na), Surlyn 9320 (Zn), Surlyn 6320 (Mg), HPF1000 (Mg), HPF2000 (Mg)" commercially available from E.I. du Pont de Nemours and Company.

Specific examples of the ionomer resin include "Iotek® (e.g. Iotek 8000 (Na), Iotek 8030 (Na), Iotek 7010 (Zn), Iotek 7030 (Zn)", and specific examples of the ternary ionomer resin include "Iotek 7510 (Zn) and Iotek 7520 (Zn)" commercially available from Exxon Mobile Chemical Corporation.

It is noted that Na, Zn, Li, and Mg described in the parentheses after the trade names indicate metal types of neutralizing metal ions of the ionomer resins. The ionomer resins may be used alone or as a mixture of at least two of them.

As described the above, the envelope layer of the golf ball of the present invention is hard. Use of an ionomer resin having a high acid content provides a hard envelope layer. The acid content is preferably 10 mass % or more and 30 mass % or less. Specific examples of the ionomer resin having a high acid content include the aforementioned "Himilan 1605, Himilan 1706, Himilan 1707, Himilan AM7311, Himilan AM7317, Himilan AM7318, Himilan AM 7329, Surlyn 6120, Surlyn 6910, Surlyn 7930, Surlyn 7940, Surlyn 8945, Surlyn 9120, Surlyn 9150, Surlyn 9910, Surlyn 9945, Surlyn AD8546, Iotek 8000, and Iotek 8030".

(5) Reinforcing Layer Composition

The reinforcing layer is formed from a reinforcing layer composition containing a resin component. As the resin component, a two-component curing type thermosetting resin is preferably used. Example of two-component curing type thermosetting resin include epoxy resins, urethane resins, acrylic resins, polyester resins and cellulose resins. In light of the strength and durability of the reinforcing layer, two-component curing type epoxy resins and two-component curing type urethane resins are preferred.

The reinforcing layer composition may include additives such as a coloring agent (for example, titanium dioxide), a phosphate-based stabilizer, an antioxidant, a light stabilizer, a fluorescent brightener, an ultraviolet absorber, an anti-blocking agent and the like. The additives may be added to either the base material or the curing agent of the two-component curing thermosetting resin.

(6) Cover Composition

The cover of the golf ball of the present invention is formed from a cover composition containing a resin component. Examples of the resin components include an ionomer resin, a thermoplastic polyamide elastomer having a trade name "Pebax®(e.g. "Pebax 2533")" commercially available from Arkema Inc., a thermoplastic polyester elastomer having a trade name "Hytrel® (e.g. "Hytrel 3548" and "Hytrel 4047")" commercially available from Du Pont-Toray Co., Ltd., a thermoplastic polyurethane elastomer having a trade name "Elastollan®(e.g. "Elastollan XNY97A")" commercially available from BASF Japan Ltd., a thermoplastic polystyrene elastomer having a trade name "Rabalon®" commercially available from Mitsubishi Chemical Corporation, and the like. These resin components may be used alone or in combination of two or more thereof.

The cover composition constituting the cover of the golf ball of the present invention preferably contains the thermoplastic polyurethane as a resin component. The content of the thermoplastic polyurethane in the resin component of the cover composition is preferably 50 mass % or more, more preferably 60 mass % or more, even more preferably 70 mass % or more.

The cover composition may contain a pigment component such as a white pigment (for example, titanium oxide), a blue pigment, a red pigment, or the like, a specific gravity adjusting agent such as zinc oxide, calcium carbonate, barium sulfate, or the like, a dispersant, an antioxidant, an ultraviolet absorber, a light stabilizer, a fluorescent material or a fluorescent brightener, or the like as long as they do not impair the performance of the cover.

The amount of the white pigment (for example, titanium oxide), with respect to 100 parts by mass of the resin component for forming the cover, is preferably 0.5 part by mass or more and more preferably 1 part by mass or more, and is preferably 10 parts by mass or less and more preferably 8 parts by mass or less. If the amount of the white pigment is 0.5 part by mass or more, it is possible to provide opacity to the cover. If the amount of the white pigment is more than 10 parts by mass, the durability of the resultant cover may deteriorate.

(7) Process for Producing Golf Ball

The center can be obtained by mixing, kneading the above mentioned rubber composition and molding the rubber composition in the mold. The conditions for press-molding the center rubber composition should be determined depending on the rubber composition. Specifically, the press-molding is preferably carried out for 10 to 60 minutes at the temperature of 130° C. to 200° C. under the pressure from 2.9 MPa to 11.8 MPa. Alternatively, the press-molding is preferably carried out in a two-step heating, for example, for 20 to 40 minutes at the temperature of 130° C. to 150° C., and continuously for 5 to 15 minutes at the temperature of 160° C. to 180° C.

For forming the envelope layer and intermediate layer, publicly known methods such as injection molding, compression molding and the like can be employed. In light of productivity, injection molding is preferred.

In case of forming the envelope layer and the intermediate layer by injection molding, it is preferred to use upper and lower molds for forming the envelope layer and the intermediate layer having a spherical cavity and pimples, wherein a part of the pimple also serves as a retractable hold pin. When forming the envelope layer and intermediate layer by injection molding, the hold pin is protruded to hold the center, and the resin composition which has been heated and melted is charged and then cooled to obtain the envelope layer and the intermediate layer. For example, the resin composition heated and melted at the temperature of 150° C. to 230° C. is charged into a mold held under the pressure of 980 KPa to 1,500 KPa for 0.1 to 1 second. After cooling for 15 to 60 seconds, the mold is opened.

The molding temperature means the highest temperature where the temperature at the surface of the concave portion of the lower mold reaches from closing through opening the molds. Further, the flow beginning temperature of the intermediate layer composition can be measured in a pellet form with the following conditions by using a flow characteristics evaluation apparatus (Flow Tester CFT-500D, manufactured by Shimadzu Corporation).

Measuring conditions: Area size of a plunger: 1 cm², Die length: 1 mm, Die diameter: 1 mm, Load: 588.399 N, Start temperature: 30° C., and Temperature increase rate: 3° C./min.

The reinforcing layer is obtained by applying, to the surface of the intermediate layer, liquids where the base material or the curing agent are dissolved or dispersed in a solvent. In light of workability, application with a spray gun is preferred. After the application, the solvent is volatilized to permit a reaction of the base material with the curing agent, thereby forming the reinforcing layer.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

When molding the cover in a compression molding method, molding of the half shell can be performed by either compression molding method or injection molding method, and the compression molding method is preferred. The compression-molding of the cover composition into a half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a cover for a golf ball having a uniform thickness can be formed.

In the case of directly injection molding the cover composition onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 200° C. to 250° C. is charged into a mold held under the pressure of 9 MPa to 15 MPa for 0.5 to 5 second. After cooling for 10 to 60 seconds, the mold is opened and the golf ball with the cover molded is taken out from the mold. When molding a cover, the concave portions called "dimple" are usually formed on the surface.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 50 μm or smaller, more preferably 40 μm or smaller, and even more preferably 30 μm or smaller. If the thickness is smaller than 5 μm, the paint film is easy to wear off due to continued use of the golf ball, and if the thickness is larger than 50 μm, the effect of the dimples is reduced, resulting in deteriorating flying performance of the golf ball.

EXAMPLES

Hereinafter, the present invention will be described in detail by way of example. The present invention is not limited to examples described below. Various changes and modifications can be made without departing from the spirit and scope of the present invention.

[Evaluation Methods]

(1) Hardness of Center (JIS-C Hardness)

A type P1 auto loading durometer manufactured by Kobunshi Keiki Co., Ltd., provided with a JIS-C type spring hardness tester was used to measure the surface hardness H1s of the center. JIS-C hardness measured at the surfaces of the center was employed as the surface hardness H1s of the center. The center was cut into two hemispheres to obtain a cut plane, and a JIS-C hardness measured at the central point of the cut plane was employed as the central hardness H1c of the center.

(2) Slab Hardness (Shore D Hardness, Shore A Hardness)

Sheets with a thickness of about 2 mm were produced by injection molding the envelope layer composition, the intermediate layer composition or the cover composition and stored at 23° C. for two weeks. Three or more of these sheets were stacked on one another so as not to be affected by the measuring base plate on which the sheets were placed, and the stack was measured with a type LA1 auto loading durometer manufactured by Kobunshi Keiki Co., Ltd., provided with a Shore D or Shore A type spring hardness tester.

(3) Compression Deformation Amount (mm)

A compression deformation amount of the center, core or golf ball (a shrinking amount of the center, core or golf ball in the compression direction thereof), when applying an initial load of 98 N to a final load of 1275 N, was measured.

(4) Melt Flow Rate (MFR) (g/10 min)

The MFR was measured using a flow tester (Shimadzu flow tester CFT-100C manufactured by Shimadzu Corporation) in accordance with JIS K7210. The measurement was conducted under the conditions of the measurement temperature 190° C. or 230° C. and the load of 2.16 kg.

(5) Flexural Modulus (Mpa) (3 Points Bending Test, MPa)

Sheets having a thickness about 2 mm were produced by heat-pressing the ionomer resin or the intermediate layer composition, and stored at 23° C. for two weeks. The flexural modulus was measured according to JIS K7171. The measurement was conducted at a temperature of 23° C. and a humidity of 50 RH.

(6) Rebound Resilience (%)

A sheet with a thickness of about 2 mm was produced by a heat press molding from the intermediate layer composition. A circle-shaped test piece having a diameter of 28 mm was cut out of this sheet, and 6 pieces of the test piece were stacked to prepare a cylindrical test piece having a thickness of about 12 mm and a diameter of 28 mm. The cylindrical test piece was subjected to the Lupke type rebound resilience test (testing temperature 23° C., humidity 50RH %). Preparation of the test piece and the testing method are based on JIS K6255.

(7) Durability

A metal-head W#1 driver was installed on a swing robot manufactured by TRUETEMPER CO, and the head speed was set to 45 m/sec. Each golf ball was stored in a constant temperature reservoir kept at the temperature of 23° C. for 12 hours, and then hit with a driver at the speed of 45 m/sec. immediately after the golf balls were taken out from the constant temperature reservoir. This procedure was repeated, and the number of hits required to break the golf ball was counted. The durability test was conducted twelve times for each golf ball. The number of hits for golf ball No. 12 was defined as an index of 100, and the durability of each golf ball was represented by converting the number of hits for each golf ball into this index. A greater index value indicates that the durability of the golf ball is excellent.

(8) Measurement of Loss Factor (tan δ)

Sheets with a thickness of 0.5 mm were produced from the intermediate layer composition. Test pieces having a length of 30 mm, a width of 4 mm, and a thickness of 0.5 mm in a plate-like form were cut out from these sheets. The both ends of test pieces were clamed with chucks so that the length of displacement becomes 20 mm. The Loss factor was measured under the following conditions using Viscoelasticity spectrometer Rheogel-E4000 available from UBM CO., Ltd to determine the Maximum Loss Factor (tan δ) between −20° C. to 0° C.

Initial load: Auto static load 200%
Amplitude: 0.025%
Frequency: 10 Hz
Initial temperature: −100° C.
End temperature: 100° C.
Temperature increasing rate: 4° C./min
Measuring mode: tensile mode (9) Spin Rate on Approach Shots An approach wedge (SRIXON I-302, Shaft S available from SRI Sports Limited) was installed on a swing robot available from Golf Laboratories, Inc. Golf balls were hit at a head speed of 21 m/sec., and a sequence of photographs of the hit golf ball were taken for measuring the spin rate (rpm). The measurement was performed ten times for each golf ball, and the average value is regarded as the spin rate (rpm).

(10) Spin Rate on Driver Shots

A driver (XXIO, shaft S, Loft angle: 11° available from SRI Sports Limited) was installed on a swing robot available from Golf Laboratories, Inc. Golf balls were hit at a head speed of 50 m/sec., and a sequence of photographs of the hit golf ball were taken for measuring the spin rate (rpm). The measurement was performed ten times for each golf ball, and the average value is regarded as the spin rate (rpm).

(11) Shot Feeling

Ten golfers hit golf balls with a driver, and were asked about the shot feeling. The evaluation was categorized as follows based on the number of golfers who answered, "the impact was small and the shot feeling was excellent".

A: 8 or more
B: 6 to 7
C: 4 to 5
D: 3 or less

[Preparation of Modified Polyester Elastomer]
(1) Modified Polyester Elastomer 1

100 parts by mass of a polyester elastomer containing 65 mass % of polytetramethylene glycol and 35 mass % of polybutylene terephthalate and 0.5 parts by mass of maleic anhydride (pulverized product), and 0.13 parts by mass of benzoyl peroxide (50% water-containing product, NYPER BWK) were mixed with a mixer, and extruded with a twin screw extruder (TEX54α manufactured by The Japan Steel Works, Ltd.) at the conditions of 200° C., 250 revolutions, and 250 kg/hr for a graft reaction of maleic anhydride to produce a modified polyester elastomer 1. The obtained modified polyester elastomer contained maleic acid component in a content of 0.4 mass %, Shore A hardness of 84, and a melt flow rate (230° C., 21N) of 24 g/10 min.

(2) Modified Polyester Elastomer 2

The modified polyester elastomer 2 was produced in the same manner as in Modified Polyester Elastomer 1 except for using a polyester elastomer containing 77 mass % of polytetramethylene glycol and 23 mass % of polybutylene terephthalate. The obtained modified polyester elastomer contained maleic acid component in a content of 0.5 mass %, Shore A hardness of 80, and a melt flow rate (230° C., 21N) of 30 g/10 min.

[Production of Golf Balls]
(1) Production of Center

Spherical centers were obtained by kneading rubber compositions having the formulations shown in Table 1, and heat-pressing the kneaded material in upper and lower molds, each having a hemispherical cavity, at 170° C. for 20 minutes. The amount of barium sulfate was appropriately adjusted to make the resultant golf ball have a mass of 45.3 g.

TABLE 1

|  | Center composition | A |
|---|---|---|
| Formulation | BR-730 | 100 |
|  | Zinc acrylate | 35 |
|  | Zinc oxide | 5 |
|  | Diphenyl disulfide | 0.5 |
|  | Dicumyl peroxide | 0.8 |
|  | Barium Sulfate | Appropriate amount |
| Center Properties | Diameter (mm) | 37.4 |
|  | Central hardness H1c (JIS-C hardness) | 62 |
|  | Surface hardness H1s (JIS-C hardness) | 83 |
|  | Compression deformation amount (mm) | 3.1 |

Formulation: parts by mass
Polybutadiene rubber: "BR-730 (high-cis polybutadiene)" manufactured by JSR Corporation
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Dicumyl peroxide: "Percumyl (registered trademark) D" manufactured by NOF Corporation
Diphenyl disulfide: manufactured by Sumitomo Seika Chemicals Company Limited (2) Preparation of Envelop layer composition, Intermediate layer composition, and Cover Composition Blending materials shown in Tables 2 to 6 were mixed with a twin-screw kneading extruder to prepare, envelop layer composition, intermediate layer compositions, and cover compositions in the pellet form, respectively. The extruding conditions were a screw diameter of 45 mm, a screw rotational speed of 200 rpm, and screw L/D=35, and the mixtures were heated to 160 to 230° C. at the die position of the extruder.

TABLE 2

| Envelope layer composition | A | B |
|---|---|---|
| Modified polyester elastomer 2 | — | 40 |
| Surlyn 8150 | 50 | 36 |
| Surlyn 9150 | — | 24 |
| Surlyn 9120 | 50 | — |
| Titanium oxide | 4 | 4 |
| Shore D hardness Hs | 70 | 53 |

Formulation: parts by mass
Surlyn 8150: Sodium ion neutralized ethylene-methacrylic acid copolymer (acid content: 16 mass % or more, flexural modulus: 364 MPa, Melt Flow Rate (190° C., 2.16 kg): 4.5, Shore D hardness: 68) available from E.I. du Pont de Nemours and Company.
Surlyn 9120: Zinc ion neutralized ethylene-methacrylic acid copolymer ionomer resin (acid content: 16 mass % or more, flexural modulus: 410 MPa, Melt Flow Rate (190° C., 2.16 kg): 1.3, Shore D hardness: 69) available from E.I. du Pont de Nemours and Company.
Surlyn 9150: Zinc ion neutralized ethylene-methacrylic acid copolymer ionomer resin (acid content: 16 mass % or more, flexural modulus: 252 MPa, Melt Flow Rate (190° C., 2.16 kg): 4.5, Shore D hardness: 64) available from E.I. du Pont de Nemours and Company.

TABLE 3

| Golf ball No. | | | 1 | 2 | 3 | 4 | 5 |
|---|---|---|---|---|---|---|---|
| Envelope Layer Composition No. | | | A | A | A | A | A |
| Envelop Layer Thickness (mm) | | | 1.2 | 1.4 | 1.4 | 1.2 | 1.2 |
| Envelop Layer Shore D hardness Hs | | | 70 | 70 | 70 | 70 | 70 |
| Intermediate layer composition | Formulation Component | Resin (A) Modified Polyester Elastomer 1 | 40 | 40 | 40 | — | — |
| | | Modified Polyester Elastomer 2 | — | — | — | 40 | 45 |
| | | Slab hardness (Shore A) | 84 | 84 | 84 | 80 | 80 |

TABLE 3-continued

| | | | Golf ball No. | 1 | 2 | 3 | 4 | 5 |
|---|---|---|---|---|---|---|---|---|
| | | (B) | Surlyn 8150 | 36 | 36 | 36 | 36 | 33 |
| | | | Surlyn 8945 | — | — | — | — | — |
| | | | Surlyn 9150 | 24 | 24 | 24 | 24 | 22 |
| | | | Himilan AM7329 | — | — | — | — | — |
| | | | Slab hardness (Shore D) | 68 | 68 | 68 | 68 | 68 |
| | | | Flexural modulus (MPa) | 450 | 450 | 450 | 450 | 450 |
| | | | MFR(190° C. × 2.16 kg, g/10 min) | 5 | 5 | 5 | 5 | 5 |
| | | (C) | TPEE | — | — | — | — | — |
| | | | Titanium oxide | 4 | 4 | 4 | 4 | 4 |
| | Properties | | Thickness (mm) | 1.0 | 1.0 | 0.8 | 1.0 | 1.0 |
| | | | Slab hardness Hm (Shore D) | 56 | 56 | 56 | 53 | 51 |
| | | | Flexural modulus (MPa) | 273 | 273 | 273 | 231 | 222 |
| | | | Max Loss Factor (tan δ, −20° C. to 0° C.) | 0.05 | 0.05 | 0.05 | 0.05 | 0.05 |
| | | | Rebound resilience (%) | 59 | 59 | 59 | 57 | 57 |
| Cover | | | Thickness (mm) | 0.5 | 0.3 | 0.5 | 0.5 | 0.5 |
| | | | Shore D hardness Hc | 32 | 32 | 32 | 32 | 32 |
| Golf | | | Compression deformation amount (mm) | 2.43 | 2.32 | 2.38 | 2.48 | 2.47 |
| Ball | | | Spin rate on driver shots (rpm) | 2200 | 2250 | 2350 | 2300 | 2350 |
| | | | Flight distance (m) | 265 | 263 | 260 | 260 | 260 |
| | | | Spin rate on approach shots (rpm) | 6800 | 6900 | 7150 | 7100 | 7150 |
| | | | Shot feeling | A | A | A | A | A |
| | | | Durability | 110 | 120 | 130 | 115 | 113 |

Formulation: Parts by mass
MFR: Melt Flow Rate

TABLE 4

| | | | Golf ball No. | 6 | 7 | 8 | 9 | 10 |
|---|---|---|---|---|---|---|---|---|
| Envelope layer Composition No. | | | | A | A | A | A | A |
| Envelope Layer Thickness (mm) | | | | 1.2 | 1.2 | 1.2 | 1.2 | 1.2 |
| Envelop Layer Shore D hardness Hs | | | | 70 | 70 | 70 | 70 | 70 |
| Intermediate | Formulation | Resin | (A) Modified Polyester Elastomer 1 | 40 | 30 | 30 | 50 | 60 |
| layer | | Component | Modified Polyester Elastomer 2 | — | — | — | — | — |
| composition | | | Slab hardness (Shore A) | 84 | 84 | 84 | 84 | 84 |
| | | (B) | Surlyn 8150 | — | 36 | — | 30 | 24 |
| | | | Surlyn 8945 | 36 | — | 42 | — | — |
| | | | Surlyn 9150 | — | 24 | — | 20 | 16 |
| | | | Himilan AM7329 | 24 | — | 28 | — | — |
| | | | Slab hardness (Shore D) | 65 | 68 | 65 | 68 | 68 |
| | | | Flexural modulus (MPa) | 330 | 450 | 330 | 450 | 450 |
| | | | MFR(190° C. × 2.16 kg, g/10 min) | 5 | 5 | 5 | 5 | 5 |
| | | (C) | TPEE | — | 10 | — | — | — |
| | | | Titanium oxide | 4 | 4 | 4 | 4 | 4 |
| | Properties | | Thickness (mm) | 1.0 | 1.0 | 1.0 | 1.0 | 1.0 |
| | | | Slab hardness Hm (Shore D) | 53 | 55 | 54 | 52 | 52 |
| | | | Flexural modulus (MPa) | 215 | 220 | 202 | 200 | 180 |
| | | | Max Loss Factor (tan δ, −20° C. to 0° C.) | 0.05 | 0.05 | 0.05 | 0.05 | 0.05 |
| | | | Rebound resilience (%) | 57 | 59 | 56 | 60 | 62 |
| Cover | | | Thickness (mm) | 0.5 | 0.5 | 0.5 | 0.5 | 0.5 |
| | | | Shore D hardness Hc | 32 | 32 | 32 | 32 | 32 |
| Golf | | | Compression deformation amount (mm) | 2.49 | 2.44 | 2.45 | 2.48 | 2.50 |
| Ball | | | Spin rate on driver shots (rpm) | 2300 | 2250 | 2350 | 2400 | 2400 |
| | | | Flight distance (m) | 260 | 262 | 260 | 259 | 259 |
| | | | Spin rate on approach shots (rpm) | 7100 | 6900 | 7160 | 7250 | 7260 |
| | | | Shot feeling | A | A | B | A | A |
| | | | Durability | 125 | 105 | 115 | 120 | 120 |

Formulation: Parts by mass
MFR: Melt Flow Rate

TABLE 5

| | | | Golf ball No. | 11 | 12 | 13 | 14 |
|---|---|---|---|---|---|---|---|
| Envelope layer Composition No. | | | | A | A | A | B |
| Envelope Layer Thickness (mm) | | | | 1.2 | 1.2 | 1.2 | 1.2 |
| Envelop Layer Shore D hardness Hs | | | | 70 | 70 | 70 | 53 |
| Intermediate | Formulation | Resin | (A) Modified Polyester Elastomer 1 | 20 | 80 | — | — |
| layer | | Component | Modified Polyester Elastomer 2 | — | — | — | — |
| composition | | | Slab hardness (Shore A) | 84 | 84 | — | — |
| | | (B) | Surlyn 8150 | 35 | 10 | 36 | 50 |
| | | | Surlyn 8945 | — | — | — | — |
| | | | Surlyn 9150 | 35 | 10 | 24 | 50 |

TABLE 5-continued

| | | Golf ball No. | 11 | 12 | 13 | 14 |
|---|---|---|---|---|---|---|
| | | Himilan AM7329 | — | — | — | — |
| | | Slab hardness (Shore D) | 68 | 68 | 68 | 68 |
| | | Flexural modulus (MPa) | 450 | 450 | 450 | 450 |
| | | MFR(190° C. × 2.16 kg, g/10 min) | 5 | 5 | 5 | 5 |
| | | (C) TPEE | 10 | — | 40 | — |
| | | Titanium oxide | 4 | 4 | 4 | 4 |
| | Properties | Thickness (mm) | 1.0 | 1.0 | 1.0 | 1.0 |
| | | Slab hardness Hm (Shore D) | 58 | 38 | 44 | 68 |
| | | Flexural modulus (MPa) | 285 | 60 | 281 | 450 |
| | | Max Loss Factor (tan δ, −20° C. to 0° C.) | 0.03 | 0.09 | 0.05 | 0.04 |
| | | Rebound resilience (%) | 54 | 64 | 63 | 57 |
| Cover | | Thickness (mm) | 0.5 | 0.5 | 0.5 | 0.5 |
| | | Shore D hardness Hc | 32 | 32 | 32 | 32 |
| Golf | | Compression deformation amount (mm) | 2.42 | 2.60 | 2.42 | 2.26 |
| Ball | | Spin rate on driver shots (rpm) | 2100 | 2600 | 2150 | 2000 |
| | | Flight distance (m) | 267 | 250 | 268 | 270 |
| | | Spin rate on approach shots (rpm) | 6600 | 7500 | 6600 | 6450 |
| | | Shot feeling | B | A | A | D |
| | | Durability | 100 | 100 | 80 | 95 |

Formulation: Parts by mass
MFR: Melt Flow Rate
SURLYN 8150: a sodium ion neutralized ethylene-methacrylic acid copolymer ionomer resin (Acid content: 16 mass % or more, flexural modulus: 364 MPa, Melt Flow Rate (190° C., 2.16 kg): 4.5, Shore D hardness: 68) available from E. I. du Pont de Nemours and Company.
SURLYN 8945: a sodium ion neutralized ethylene-methacrylic acid copolymer ionomer resin (Acid content: less than 16 mass %, flexural modulus: 254 MPa, Melt Flow Rate (190° C., 2.16 kg): 5, Shore D hardness: 61) available from E. I. du Pont de Nemours and Company.
SURLYN 9150: a zinc ion neutralized ethylene-methacrylic acid copolymer ionomer resin (Acid content: 16 mass % or more, flexural modulus: 252 MPa, Melt Flow Rate (190° C., 2.16 kg): 4.5, Shore D hardness: 64) available from E. I. du Pont de Nemours and Company.
HIMILAN AM7329: a zinc ion neutralized ethylene-methacrylic acid copolymer ionomer resin (Acid content: less than 16 mass %, flexural modulus: 240 MPa, Melt Flow Rate (190° C., 2.16 kg): 5, Shore D hardness: 59) available from Du Pont-Mitsui Polychemicals Co., Ltd.
TPEE: Thermoplastic polyester elastomer (65 mass % of polytetramethylene glycol and 35 mass % of polybutylene terephthalate)

TABLE 6

| Cover composition | | A |
|---|---|---|
| Formulation | Elastollan XNY85A | 100 |
| | Titanium oxide | 4 |
| Slab hardness Hc (Shore D) | | 32 |

Formulation: parts by mass
Elastollan XNY85A: $H_{12}$MDI-polyether thermoplastic polyurethane elastomer available from BASF Japan (3) Production of Core The envelope layer compositions obtained above were injection-molded onto the centers to mold envelope layers covering the centers. By the same method, the intermediate layer compositions were injection-molded to form the intermediate layers covering the envelope layers and prepare spherical cores. Upper and lower molds for the envelope layer, the intermediate layer and the cover have a spherical cavity with pimples, a part of pimples serves a hold pin which is retractable.

When molding the envelope layer and intermediate layer, the hold pins were protruded to hold the center, the envelope layer composition and intermediate layer heated at 260° C. was charged into the mold under a pressure of 80 tons within 0.3 seconds, and cooled for 30 seconds. Then, the mold was opened, and the core was taken out from the mold.

The reinforcing layer is formed by applying a two-component curing type thermosetting resin to the obtained core. As the two-component curing type thermosetting resin, a paint composition (trade name "POLIN 750LE", available from SHINTO PAINT CO., LTD.) including a two-component curing type epoxy resin as a base polymer was used. The base material liquid of this paint composition includes 30 parts by mass of a bisphenol A type solid epoxy resin and 70 parts by mass of a solvent. The curing agent liquid of this paint composition includes 40 parts by mass of a modified polyamide amine, 5 parts by mass of titanium oxide, and 55 parts by mass of a solvent. The mass ratio of the base material liquid to the curing agent liquid is 1/1. This paint composition was applied to the surface of the intermediate layer with a spray gun, and maintained at 23° C. for 6 hours to obtain a reinforcing layer with a thickness of 10 μm.

(4) Molding of Half Shells

Compression molding of half shells were performed by, charging one pellet of the cover composition obtained as described above into each of depressed parts of lower molds for molding half shells, and applying pressure to mold half shells. Compression molding was performed at a temperature of 170° C. for 5 minutes under a molding pressure of 2.94 MPa.

(5) Molding of the Cover

The core obtained in (3) was covered with the two half shells obtained in (4) in a concentric manner, and the cover was molded by compression molding. Compression molding was performed at a temperature of 145° C. for 2 minutes under a molding pressure of 9.8 MPa.

Surface of the obtained golf ball body was subjected to a sandblast treatment, and marking, and then clear paint was applied thereto and dried in an oven at a temperature of 40° C. to obtain a golf ball having a diameter of 42.7 mm and a weight of 45.3 g. The performance of the obtained golf ball was evaluated, and results thereof are also shown in Tables 3 to 5.

Each of golf balls No. 1 to 10 is a golf ball having a center, an envelope layer disposed outside the center, an intermediate layer disposed outside the envelope layer and a cover disposed outside the intermediate layer, wherein the intermediate layer has a thickness Tm less than 1.2 mm, the envelope layer has a Shore D hardness Hs of 60 or more, the intermediate layer has a Shore D hardness Hm in a range from 40 to 60, and the cover has a Shore D hardness Hc less than 40, and the hardness Hs, Hm and Hc satisfy a following mathematical expression: Hs>Hm>Hc, and wherein the intermediate layer is formed from an intermediate layer composition having a flexural modulus ranging from 150 MPa to 450 MPa, a maximum loss factor (tan δ) between −20° C. and 0° C. of 0.08 or less, and a rebound resilience of 55% or more, and the intermediate layer composition comprises, as a resin component, 30 mass % to 70 mass % of (A) a modified polyester elastomer having a Shore A hardness of 95 or less; 70 mass % to 30 mass % of (B) a binary ionomer resin having a Shore D hardness of 65 or more, a flexural modulus of 300 MPa or more, and a melt flow rate (190° C., 2.16 kg) of 1.0 g/10 min or more; and 0 mass % to 50 mass % of (C) a thermoplastic resin other than (A) component and (B) component (provided that a total content of (A) component, (B) component, and (C) component is 100 mass %). The results indicated that each of the golf ball of the present invention travels a great flight distance on driver shots while having a high spin rate on approach shots, with an excellent shot feeling and durability. The results also indicated that there is no problem for the moldability of the intermediate layers of each golf ball.

Golf ball No. 11 is the case that the intermediate layer is formed from an intermediate layer composition having a low content of the modified polyester elastomer and having a rebound resilience of 54%. Although the flight distance of the golf ball was great, the spin rate on approach shots was low and the shot feeling was slightly lowered. Golf ball No. 12 is the case that the intermediate layer is formed from an intermediate layer composition having a relatively high content of the modified polyester elastomer and having a maximum loss factor (tan δ) between −20° C. and 0° C. of 0.09. Because the Shore D hardness Hm of the intermediate layer decreases to 38, the spin rate on driver shots was increased and thus the flight distance on driver shots was shortened. Golf ball No. 13 is the case that the intermediate layer is formed from an intermediate layer composition which does not contain a modified polyester elastomer. The spin rate on approach shots was low and the durability was lowered. Golf ball No. 14 is the case that the envelope layer has a Shore D hardness Hs of 53 and the intermediate layer has a Shore D hardness Hm of 68. The shot feeling and the durability were lowered.

The present invention is directed to a golf ball and provides a golf ball traveling a great distance on driver shots while having a high spin rate on approach shots, with an excellent shot feeling and durability. This application is based on Japanese Patent application No. 2011-35835 filed on Feb. 22, 2011, the contents of which are hereby incorporated by reference.

The invention claimed is:

1. A golf ball having a center, an envelope layer disposed outside the center, an intermediate layer disposed outside the envelope layer and a cover disposed outside the intermediate layer, wherein the intermediate layer has a thickness Tm less than 1.2 mm, the envelope layer has a Shore D hardness Hs of 60 or more, the intermediate layer has a Shore D hardness Hm in a range from 40 to 60, and the cover has a Shore D hardness Hc less than 40, and the hardness Hs, Hm and Hc satisfy a following mathematical expression: Hs>Hm>Hc, and wherein the intermediate layer is formed from an intermediate layer composition having a flexural modulus ranging from 150 MPa to 450 MPa, a maximum loss factor (tan δ) between −20° C. and 0° C. of 0.08 or less, and a rebound resilience of 55% or more, and the intermediate layer composition comprises, as a resin component, 30 mass % to 70 mass % of (A) a modified polyester elastomer having a Shore A hardness of 95 or less;

70 mass % to 30 mass % of (B) a binary ionomer resin having a Shore D hardness of 65 or more, a flexural modulus of 300 MPa or more, and a melt flow rate (190° C., 2.16 kg) of 1.0 g/10 min or more; and 0 mass % to 50 mass % of (C) a thermoplastic resin other than (A) component and (B) component (provided that a total content of (A) component, (B) component, and (C) component is 100 mass %).

2. The golf ball according to claim 1, wherein the modified polyester elastomer is obtained by a reaction between 0.01 mass % to 30 mass % of (a-3) an unsaturated carboxylic acid or a derivative thereof and 100 mass % of (a-2) a polyester elastomer containing a polyalkylene glycol component in a content ranging from 5 mass % to 90 mass % in a presence of (a-1) a radical generator.

3. The golf ball according to claim 2, wherein a blending ratio of (a-1) component ranges from 0.001 mass % to 3 mass % with respect to 100 mass % of (a-2) component.

4. The golf ball according to claim 1, wherein a content of an acid component in (B) the binary ionomer resin is 15 mass % or more.

5. The golf ball according to claim 1, wherein (C) component is at least one member selected from the group consisting of polyurethane, polyolefin, polyester, polyamide, polystyrene, polycarbonate, polyacetal, modified poly(phenyleneether), polyimide, polysulfone, polyethersulfone, poly(phenylenesulfide), polyarylate, polyamideimide, polyetherimide, polyetheretherketone, polyetherketone, polytetrafluororoethylene, polyaminobismaleimide, polybisamidetriazole, an acrylonitrile-butadiene-styrene copolymer, an acrylonitrile-styrene copolymer, and an acrylonitrile-EPDM-styrene copolymer.

6. The golf ball according to claim 1, wherein the intermediate layer composition contains at least one filler selected from the group consisting of gold, tungsten, lead, copper, iron, cast iron, pig iron, zinc, titanium, aluminum, zirconium, aluminum oxide, bismuth oxide, cerium oxide, copper oxide, tin oxide, titanium oxide, yttrium oxide, zinc oxide, silica, barium sulfate, calcium carbonate, talc, montmorillonite, and mica in an amount ranging from 1 part to 40 parts by mass with respect to 100 parts by mass of the resin component.

7. The golf ball according to claim 1, wherein the intermediate layer composition has a melt flow rate (230° C., 2.16 kg) in a range from 3 g/10 min to 30 g/10 min.

8. The golf ball according to claim 1, wherein the cover has a thickness Tc of 1.0 mm or less.

9. The golf ball according to claim 1, wherein the cover contains thermoplastic polyurethane as a resin component.

10. The golf ball according to claim 1, wherein the envelope layer contains an ionomer resin as a resin component.

11. The golf ball according to claim 1, wherein the center is formed by crosslinking a rubber composition including a polybutadiene rubber.

12. The golf ball according to claim 1, wherein the center has a diameter in a range from 35.0 mm to 41.6 mm.

13. The golf ball according to claim 1, further comprising a reinforcing layer disposed between the intermediate layer and the cover, wherein the reinforcing layer has a thickness ranging from 3 μm to 30 μm.

14. The golf ball according to claim 1, wherein the center has a hardness difference (H1s-H1c) between a surface hardness H1s thereof and a central hardness H1c thereof in a range from 5 to 35 in JIS-C hardness.

15. The golf ball according to claim 1, wherein the envelope layer has a thickness Ts in a range from 0.5 mm to 2.4 mm.

16. The golf ball according to claim 1, wherein a sum (Tm+Tc) of the intermediate layer thickness Tm and a cover thickness Tc ranges from 0.2 mm to 1.6 mm.

17. The golf ball according to claim 1, wherein a difference (Hs−Hm) between Shore D hardness Hs of the envelope layer and Shore D hardness Hm of the intermediate layer ranges from 3 to 30.

18. The golf ball according to claim 1, wherein a difference (Hm−Hc) between Shore D hardness Hm of the intermediate layer and Shore D hardness Hc of the cover ranges from 5 to 35.

* * * * *